(12) United States Patent
Yang et al.

(10) Patent No.: US 11,349,322 B2
(45) Date of Patent: May 31, 2022

(54) FEMALE AND MALE CONNECTING MEMBERS FOR IMPROVED TRANSMISSION EFFICIENCY

(71) Applicant: Guangdong OPPO Mobile Telecommunications Corp., Ltd., Guangdong (CN)

(72) Inventors: Zimei Yang, Guangdong (CN); Maozhao Huang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 427 days.

(21) Appl. No.: 16/518,535

(22) Filed: Jul. 22, 2019

(65) Prior Publication Data

US 2020/0028371 A1     Jan. 23, 2020

(30) Foreign Application Priority Data

Jul. 23, 2018   (CN) .......................... 201821167405.4

(51) Int. Cl.
*H01M 10/44*   (2006.01)
*H02J 7/00*    (2006.01)
*H01R 31/06*   (2006.01)

(52) U.S. Cl.
CPC .......... *H02J 7/0044* (2013.01); *H01R 31/065* (2013.01); *H02J 7/0027* (2013.01)

(58) Field of Classification Search
CPC .... H02J 7/0044; H02J 7/0042; H04M 1/0274; H04M 1/0252; H04M 1/0249;

(Continued)

(56) References Cited

U.S. PATENT DOCUMENTS

| 2007/0178739 A1* | 8/2007 | Kuwayama | ........ H01R 13/6272 439/352 |
| 2014/0220823 A1* | 8/2014 | Ando | ..................... H01R 13/66 439/620.01 |
| 2020/0260582 A1* | 8/2020 | Rasmussen | ............ H05K 1/118 |

FOREIGN PATENT DOCUMENTS

| CN | 101170226 A | 4/2008 |
| CN | 102610975 A | 7/2012 |

(Continued)

OTHER PUBLICATIONS

International search report,PCT/CN2019/096589, dated Oct. 28, 2019 (4 pages).

(Continued)

*Primary Examiner* — Edward Tso
(74) *Attorney, Agent, or Firm* — Young Basile Hanlon & MacFarlane, P.C.

(57) ABSTRACT

The present disclosure relates to a female connecting member and a male connecting member, a connector, a mobile terminal and an electronic equipment, wherein the female connecting member includes a first end face, the first end face has a first groove, the first groove is defined by a first side face and a first bottom face encompassed by the first side face, the first side face is provided with N*M contacts, the contacts are arranged in N rows along a depth direction of the first groove, N is an integer greater than or equal to 2, each row includes M contacts distributed along a circumferential direction of the first side face, and M is an integer greater than or equal to 2. In this way, enough contacts can be provided to improve the transmission efficiency of current or data, thus meeting the needs of fast charging or large-flow data transmission.

19 Claims, 13 Drawing Sheets

(58) Field of Classification Search
CPC ....... H01R 24/86; H01R 33/20; G06F 1/1632; G06F 1/1683; G06F 1/18
USPC ......... 320/107, 111, 114, 115; 439/759, 816, 439/692, 675, 671
See application file for complete search history.

(56) References Cited

FOREIGN PATENT DOCUMENTS

| | | | | |
|---|---|---|---|---|
| CN | 103066442 | A | 4/2013 | |
| CN | 104485555 | A | 4/2015 | |
| CN | 204668528 | U | 9/2015 | |
| CN | 105720422 | A | 6/2016 | |
| CN | 206850197 | U | 1/2018 | |
| CN | 208767493 | U * | 4/2019 | ........... H01R 13/639 |
| EP | 2928023 | A1 | 10/2015 | |
| KR | 20150072025 | A | 6/2015 | |
| WO | 2017203366 | A1 | 11/2017 | |
| WO | 2017203449 | A1 | 11/2017 | |

OTHER PUBLICATIONS

European search report, EP19187762, dated Dec. 6, 2019 (10 pages).
Indian first exapmination report, Application No. 201914029277, dtaed May 27, 2020 (5 pages).

* cited by examiner

FEMALE AND MALE CONNECTING MEMBERS FOR IMPROVED TRANSMISSION EFFICIENCY

CROSS-REFERENCE TO RELATED APPLICATION(S)

This application claims priority to Chinese Patent Application No. 201821167405.4, filed on Jul. 23, 2018, the content of which is herein incorporated by reference in its entirety.

TECHNICAL FIELD

The present disclosure relates to the technical field of electronic equipment, in particular to a female connecting member, a male connecting member, a connector, a mobile terminal, and an electronic equipment.

BACKGROUND

With the rapid development of electronic products and the continuous improvement of people's living standards, the use of various mobile terminals such as smart phones is becoming more and more popular. At present, the charging or data transmission interface of mobile terminals is mainly USB (universal serial bus) port at the bottom, which has only a few contacts and single function.

SUMMARY

An embodiment of the present disclosure provides a female connecting member. The female connecting member includes a first end face, the first end face has a first groove, the first groove is defined by a first side face and a first bottom face encompassed by the first side face, the first side face is provided with N*M contacts, the contacts are arranged in N rows along a depth direction of the first groove, N is an integer greater than or equal to 2, and each row includes M contacts distributed along a circumferential direction of the first side face, and M is an integer greater than or equal to 2.

An embodiment of the present disclosure provides a male connecting member. The male connecting member includes a first bottom face, the first bottom face is provided with a first boss, and the first boss includes first side face and a first top face encompassed by the first side face; the first side face is provided with N*M contacts, the contacts are arranged in N rows along a height direction of the first boss, N is an integer greater than or equal to 2, each row includes M contacts distributed along a circumferential direction of the first boss, and M is an integer greater than or equal to 2.

An embodiment of the present disclosure provides a mobile terminal. The mobile terminal includes a back shell and the female connecting member described above or the male connecting member described above, and the female connecting member or the male connecting member is provided in the back shell.

BRIEF DESCRIPTION OF DRAWINGS

In order to more clearly explain the technical solution in the embodiment of the present disclosure, the following will briefly introduce the drawings needed in the description of the embodiment. Obviously, the drawings in the following description are only some embodiments of the disclosure. For those of ordinary skill in the art, other drawings can be obtained according to these drawings without creative efforts.

DETAILED DESCRIPTION

Figure 1:
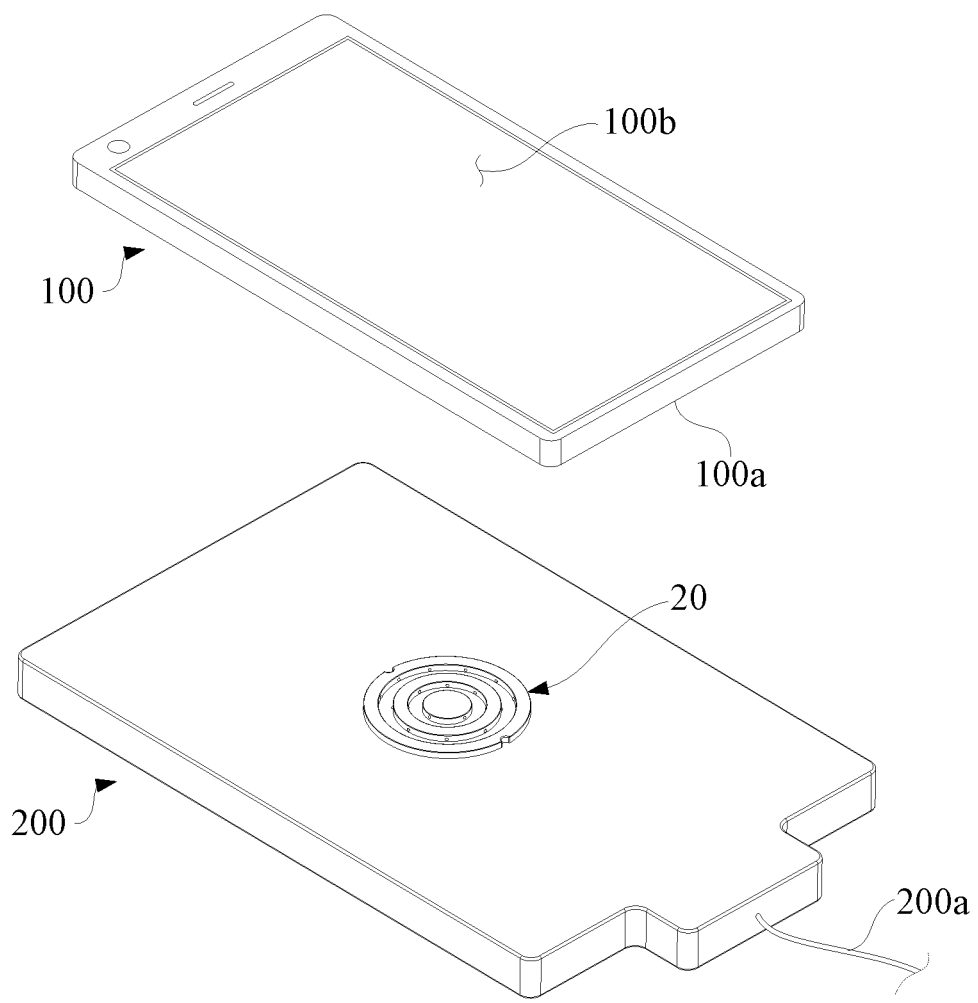
FIG. 1 is a schematic structural view of a mobile terminal and a charging device according to an embodiment.

In order to facilitate the understanding of the present disclosure, the present disclosure will be described more fully below with reference to the relevant drawings. However, the present disclosure can be implemented in many different forms and is not limited to the embodiments described herein. On the contrary, these embodiments are provided for a more thorough and comprehensive understanding of the disclosure of the present disclosure.

In the present application, a terminal device used herein includes, but is not limited to, a device that is configured to receive/transmit communication signals via one or more of the following connection manners: (i) a wire line connection, such as via a public-switched telephone network (PSTN), digital subscriber line (DSL), digital cable, a direct cable connection; (ii) a wireless interface, for example, a cellular network, a wireless local area network (WLAN), a digital television network such as a DVB-H network, a satellite network, an AM-FM broadcast transmitter.

A terminal device that is set to communicate over a wireless interface may be referred to as a mobile terminal.

Examples of the mobile terminal include, but are not limited to the following electric device: (i) a satellite or cellular radiotelephone; (ii) a Personal Communications System (PCS) terminal that may combine a cellular radiotelephone with data processing, facsimile and data communications capabilities; (iii) a PDA that can include a radiotelephone, pager, Internet/intranet access, Web browser, organizer, calendar and/or a global positioning system (GPS) receiver; (iv) a conventional laptop and/or palmtop receiver; (v) a conventional laptop and/or palmtop radiotelephone transceiver.

The present disclosure relates to a female connecting member. The female connecting member includes a first end face, the first end face has a first groove, the first groove is defined by a first side face and a first bottom face encompassed by the first side face, the first side face is provided with N*M contacts, the contacts are arranged in N rows along a depth direction of the first groove, N is an integer greater than or equal to 2, and each row includes M contacts distributed along a circumferential direction of the first side face, and M is an integer greater than or equal to 2.

In an embodiment, the first groove is an annular groove.

In an embodiment, the N*M contacts are distributed in N rows and M columns in the first side face.

In an embodiment, when N is an integer greater than or equal to 3 and M is an integer greater than or equal to 3, N contacts located in the same column are equally spaced and M contacts located in the same row are equally spaced.

In an embodiment, X contacts of the M contacts located in the same row are arranged in parallel, and X is an integer greater than 1 and less than or equal to M.

In an embodiment, a second groove is annularly disposed around the periphery of the first groove, and the second groove is defined by a second side face, a second bottom face, and a third side face, wherein the second side face and the third side face are facing towards each other and connected by the second bottom face, and the second side face and the first side face are facing away from each other and connected by the first end face; the second side face is provided with P*Q contacts, wherein P is an integer greater than or equal to 2, and Q is an integer greater than or equal to 2.

In an embodiment, a second groove is annularly disposed around the periphery of the first groove, and the second groove is defined by a second side face, a second bottom face and a third side face, wherein the second side face and the third side face are facing towards each other and connected by the second bottom face, and the second side face and the first side face are facing away from each other and connected by the first end face; the third side face is provided with E*F contacts, wherein E is an integer greater than or equal to 2, and F is an integer greater than or equal to 2.

In an embodiment, the second side face is provided with P*Q contacts, wherein P is an integer greater than or equal to 2, and Q is an integer greater than or equal to 2.

In an embodiment, a third groove is annularly disposed around the periphery of the second groove, and the third groove is defined by a fourth side face, a third bottom face, and a fifth side face, wherein the fourth side face and the fifth side face are facing towards each other and connected by the third bottom face, and the fourth side face and the third side face are facing away from each other and connected by the first end face; the fourth side face is provided with R*S contacts, wherein R is an integer greater than or equal to 2, and S is an integer greater than or equal to 2.

In an embodiment, the first groove, the second groove and the third groove are all circular ring-shaped grooves, and the centers of the circular ring-shaped grooves are the same.

In an embodiment, a third groove is annularly disposed around the periphery of the second groove, and the third groove is defined by a fourth side face, a third bottom face and a fifth side face, wherein the fourth side face and the fifth side face are facing towards each other and connected by the third bottom face, and the fourth side face and the third side face are facing away from each other and connected by the first end face; the fifth side face is provided with J*K contacts, wherein J is an integer greater than or equal to 2, and K is an integer greater than or equal to 2.

In an embodiment, the fourth side face is provided with R*S contacts, wherein R is an integer greater than or equal to 2, and S is an integer greater than or equal to 2.

In an embodiment, the first groove, the second groove and the third groove are all circular ring-shaped grooves, and the centers of the circular ring-shaped grooves are the same.

In an embodiment, the female connecting member is provided with contact pieces corresponding to the contacts in the female connecting member, and a spring is arranged between the contact in the female connecting member and the corresponding contact piece; when a male connecting member is not engaged with the female connecting member, the spring drives the contact in the female connecting member to leave the corresponding contact piece, and when the male connecting member is engaged with the female connecting member, the male connecting member drives the contacts in the female connecting member to press against the spring and contact with the corresponding contact piece.

In an embodiment, the contact is provided with a stepped portion, and the spring elastically abuts between the stepped portion and the contact piece.

In an embodiment, the depth direction of the first groove is perpendicular to the first end face, the first side face extends inwards from the first end face, the first side face is perpendicular to the first end face, and the first bottom face is perpendicular to the first side face.

An embodiment of the present disclosure provides a male connecting member. The male connecting member includes a first bottom face, the first bottom face is provided with a first boss, and the first boss includes first side face and a first top face encompassed by the first side face; the first side face is provided with N*M contacts, the contacts are arranged in N rows along a height direction of the first boss, N is an integer greater than or equal to 2, each row includes M contacts distributed along a circumferential direction of the first boss, and M is an integer greater than or equal to 2.

In an embodiment, the first boss is an annular boss.

In an embodiment, N*M contacts are distributed in N rows and M columns in the first side face.

In an embodiment, when N is an integer greater than or equal to 3 and M is an integer greater than or equal to 3, N contacts located in the same column are equally spaced and M contacts located in the same row are equally spaced.

In an embodiment, X contacts of the M contacts located in the same row are arranged in parallel, and X is an integer greater than 1 and less than or equal to M.

In an embodiment, the first bottom face is provided with a second boss, the second boss is annularly disposed around the periphery of the first boss, the second boss includes a second side face, a second top face, and a third side face, wherein the second side face and the third side face are facing away from each other and connected by the second top face, and the second side face and the first side face are facing towards each other and connected by the first bottom face; the second side face is provided with P*Q contacts, wherein P is an integer greater than or equal to 2, and Q is an integer greater than or equal to 2.

In an embodiment, the first bottom face is provided with a second boss, the second boss is annularly disposed around the periphery of the first boss, the second boss includes a second side face, a second top face and a third side face, wherein the second side face and the third side face are facing away from each other and connected by the second top face, and the second side face and the first side face are facing towards each other and connected by the first bottom face; the third side face is provided with E*F contacts, wherein E is an integer greater than or equal to 2, and F is an integer greater than or equal to 2.

In an embodiment, the second side face is provided with P*Q contacts, wherein P is an integer greater than or equal to 2, and Q is an integer greater than or equal to 2.

In an embodiment, the male connecting member includes a second bottom face, a third boss is disposed in the second bottom face, the third boss is annularly disposed around the periphery of the second boss, the third boss includes a fourth side face, a third top face and a fifth side face, wherein the fourth side face and the fifth side face are facing away from each other and connected by the third top face, and the fourth side face and the third side face are facing towards each other and connected by the second bottom face; the fourth side face is provided with R*S contacts, wherein R is an integer greater than or equal to 2, and S is an integer greater than or equal to 2.

In an embodiment, the first boss, the second boss and the third boss are all circular ring-shaped bosses, and the centers of the circular ring-shaped bosses are the same.

In an embodiment, the male connecting member includes a second bottom face, a third boss is disposed in the second bottom face, the third boss is annularly disposed around the periphery of the second boss, the third boss includes a fourth side face, a third top face and a fifth side face, wherein the fourth side face and the fifth side face are facing away from each other and connected by the third top face, and the fourth side face and the third side face are facing towards each other and connected by the second bottom face; the fifth side face is provided with J*K contacts, wherein J is an integer greater than or equal to 2, and K is an integer greater than or equal to 2.

In an embodiment, the fourth side face is provided with R*S contacts, wherein R is an integer greater than or equal to 2, and S is an integer greater than or equal to 2.

In an embodiment, the first boss, the second boss and the third boss are all circular ring-shaped bosses, and the centers of the circular ring-shaped bosses are the same.

In an embodiment, the male connecting member is provided with contact pieces corresponding to the contacts in the male connecting member, and a spring is provided between the contact in the male connecting member and the corresponding contact piece; when the male connecting member is not engaged with a female connecting member, the spring drives the contact in the male connecting member to leave the corresponding contact piece, and when the male connecting member is engaged with a female connecting member, the female connecting member drives the contact in the male connecting member to press against the spring and contact with the corresponding contact piece.

In an embodiment, the contact is provided with a stepped portion, and the spring elastically abuts between the stepped portion and the contact piece.

In an embodiment, the height direction of the first boss is perpendicular to the bottom face, the first side face extends outwards from the first bottom face, the first side face is perpendicular to the first bottom face, and the first top face is perpendicular to the first side face.

An embodiment of the present disclosure provides a connector. The connector includes the female connecting member described above and the male connecting member described above, and the male connecting member is configured to be engaged with the female connecting member, wherein when the male connecting member is engaged with the female connecting member, the first boss is embedded in the first groove, and the N*M contacts located in the first side face of the first boss and the N*M contacts located in the first side face of the first groove are in one-to-one correspondence and contact with each other.

In an embodiment, a second groove is annularly disposed around the periphery of the first groove, the second groove is defined by a second side face, a second bottom face and a third side face, the second side face and the third side face are facing towards each other and connected by the second bottom face, and the second side face and the first side face are facing away from each other and connected by the first end face; the first bottom face is provide with a second boss, and the second boss is annularly disposed around the periphery of the first boss, the second boss include a second side face, a second top face and a third side face, wherein the second side face and the third side face are facing away from each other and are connected by the second top face, and the second side face and the first side face are facing towards each other and connected by the first bottom face; the second side face and the second side face are both provided with P*Q contacts, and when the male connecting member is engaged with the female connecting member, the P*Q contacts located in the second side face and the P*Q contacts located in the second side face are in one-to-one correspondence and contact with each other, wherein P is an integer greater than or equal to 2, and Q is an integer greater than or equal to 2.

In an embodiment, a second groove is annularly disposed around the periphery of the first groove, the second groove is defined by a second side face, a second bottom face and a third side face, wherein the second side face and the third side face are facing towards each other and connected by the second bottom face, and the second side face and the first side face are facing away from each other and connected by the first end face; the first bottom face is provide with a second boss, the second boss is annularly disposed around the periphery of the first boss, the second boss include a second side face, a second top face and a third side face, wherein the second side face and the third side face are facing away from each other and connected by the second top face, and the second side face and the first side face are facing towards each other and connected by the first bottom face; the third side face and the third side face are both provided with E*F contacts, and when the male connecting member is engaged with the female connecting member, the E*F contacts located in the third side face and the E*F contacts located in the third side face are in one-to-one correspondence and contact with each other, wherein E is an integer greater than or equal to 2, and F is an integer greater than or equal to 2.

In an embodiment, the second side face and the second side face are both provided with P*Q contacts, and when the male connecting member is engaged with the female connecting member, the P*Q contacts located in the second side face and the P*Q contacts located in the second side face are in one-to-one correspondence and contact with each other, wherein P is an integer greater than or equal to 2, and Q is an integer greater than or equal to 2.

In an embodiment, a third groove is annularly disposed around the periphery of the second groove, and the third groove is defined by a fourth side face, a third bottom face and a fifth side face, wherein the fourth side face and the fifth side face are facing towards each other and connected by the third bottom face, and the fourth side face and the third side face are facing away from each other and connected by the first end face; the male connecting member is provided with a second bottom face, a third boss is disposed in the second bottom face, the third boss is annularly disposed around the periphery of the second boss, and the third boss includes a fourth side face, a third top face and a fifth side face, wherein the fourth side face and the fifth side face are facing away from each other and connected by the third top face, and the fourth side face and the third side face are facing towards each other and connected by the second bottom face; the fourth side face and the fourth side face are both provided with R*S contacts, and when the male connecting member is engaged with the female connecting member, the R*S contacts located in the fourth side face and the R*S contacts located in the fourth side face are in one-to-one correspondence and contact with each other, wherein R is an integer greater than or equal to 2, and S is an integer greater than or equal to 2.

In an embodiment, a third groove is annularly disposed around the periphery of the second groove, and the third groove is defined by a fourth side face, a third bottom face and a fifth side face, wherein the fourth side face and the fifth side face are facing towards each other and connected by the third bottom face, and the fourth side face and the third side face are facing away from each other and connected by the first end face; the male connecting member is provided with a second bottom face, a third boss is disposed in the second bottom face, the third boss is annularly disposed around the periphery of the second boss, and the third boss includes a fourth side face, a third top face and a fifth side face, wherein the fourth side face and the fifth side face are facing away from each other and connected by the third top face, and the fourth side face and the third side face are facing towards each other and connected by the second bottom face; the fifth side face and the fifth side face are both provided with J*K contacts, and when the male connecting member is engaged with the female connecting member, the J*K contacts located in the fifth side face and the J*K contacts located in the fifth side face are in one-to-one correspondence and contact with each other, wherein J is an integer greater than or equal to 2, and K is an integer greater than or equal to 2.

In an embodiment, the fourth side face and the fourth side face are both provided with R*S contacts, and when the male connecting member is engaged with the female connecting member, the R*S contacts located in the fourth side face and the R*S contacts located in the fourth side face are in one-to-one correspondence and contact with each other, wherein R is an integer greater than or equal to 2, and S is an integer greater than or equal to 2.

In an embodiment, the first groove, the second groove and the third groove are all circular ring-shaped grooves, and the centers of the circular ring-shaped grooves are the same; the first boss, the second boss and the third boss are all circular ring-shaped bosses, and the centers of the circular ring-shaped bosses are the same.

In an embodiment, the female connecting member is provided with contact pieces corresponding to the contacts in the female connecting member, and a spring is arranged between the contact in the female connecting member and the corresponding contact piece; when the male connecting member is not engaged with the female connecting member, the spring drives the contact in the female connecting member to leave the corresponding contact piece, and when the male connecting member is engaged with the female connecting member, the male connecting member drives the contact in the female connecting member to press against the spring and contact with the corresponding contact piece.

In an embodiment, the male connecting member is provided with contact pieces corresponding to the contacts in the male connecting member, and a spring is arranged between the contact in the male connecting member and the corresponding contact piece; when the male connecting member is not engaged with the female connecting member, the spring drives the contact in the male connecting member to leave the corresponding contact piece, and when the male connecting member is engaged with the female connecting member, the female connecting member drives the contact in the male connecting member to press against the spring and contact with the corresponding contact piece.

In an embodiment, the female connecting member is provided with contact pieces corresponding to the contacts in the female connecting member, and a spring is arranged between the contact in the female connecting member and the corresponding contact piece; when the male connecting member is not engaged with the female connecting member, the spring drives the contact in the female connecting member to leave the corresponding contact piece, and when the male connecting member is engaged with the female connecting member, the male connecting member drives the contact in the female connecting member to press against the spring and contact with the corresponding contact piece.

In an embodiment, the connector includes any one of the following solutions: the female connecting member is provided with a limiting projection, and the male connecting member is provided with a limiting slot that is configured to be engaged with the limiting projection; the female connecting member is provided with a limiting slot; the male connecting member is provided with a limiting projection that is configured to be engaged with the limiting slot.

An embodiment of the present disclosure provides a data line. The data line includes the female connecting member described above or the male connecting member described above.

An embodiment of the present disclosure provides an adapter. The adapter includes the female connecting member described above or the male connecting member described above.

An embodiment of the present disclosure provides a portable power source. The portable power source includes the female connecting member described above or the male connecting member described above.

An embodiment of the present disclosure provides a mobile terminal. The mobile terminal includes a back shell and the female connecting member described above or the male connecting member described above, and the female connecting member or the male connecting member is provided in the back shell.

In an embodiment, the back shell includes a flat plate portion facing away from a display screen of the mobile terminal, and the female connecting member or the male connecting member is disposed in the flat plate portion.

An embodiment of the present disclosure provides a mobile terminal. The mobile terminal includes a host terminal and a display terminal, wherein the host terminal includes a processor, a first battery and a mainboard, and the processor and the first battery are both connected with the mainboard; the display terminal includes a display screen and a second battery, wherein the display screen is connected with the second battery; the display terminal is configured to be detachably mounted in the host terminal, the host terminal includes a connecting portion, the display terminal includes an engaging portion which is configured to be engaged with the connecting portion, and when the display terminal is mounted in the host terminal, the connecting portion is engaged with the engaging portion to transmit data or current between the host and the display screen.

In an embodiment, the host terminal includes a first wireless communication unit and the display terminal includes a second wireless communication unit, and the host terminal and the display terminal are configured to be communicatively connected by the first wireless communication unit and the second wireless communication unit in a state where the display terminal is detached from the host terminal.

In an embodiment, the first wireless communication unit and the second wireless communication unit are both Bluetooth units, or alternatively the first wireless communication unit and the second wireless communication unit are both WIFI units.

In an embodiment, one of the connecting portion and the engaging portion is the female connecting member described above, and the other is the male connecting member described above.

An embodiment of the present disclosure provides an electronic equipment. The electronic equipment includes a first electronic device and a second electronic device, one of the first electronic device and the second electronic device is provided with the female connecting member described above; the other of the first electronic device and the second electronic device is provided with the male connecting member described above which is configured to be engaged with the female connecting member to transmit data or current between the first electronic device and the second electronic device.

The present disclosure provides an electronic equipment, which includes a first electronic device and a second electronic device, wherein the first electronic device and the second electronic device can be connected through a connector to realize data or current transmission between the first electronic device and the second electronic device. The connector includes a female connecting member 10 and a male connecting member 20 that can be engaged with the female connecting member 10, so that one of the female connecting member 10 and the male connecting member 20 is disposed in the first electronic device, and the other of the female connecting member 10 and the male connecting member 20 is disposed in the second electronic device. For example, the female connecting member 10 is disposed in the first electronic device, and the male connecting member 20 is disposed in the second electronic device, so that the first electronic device and the second electronic device can be connected together through the engagement of the male connecting member 20 and the female connecting member 10 to realize data or current transmission.

Figure 2:
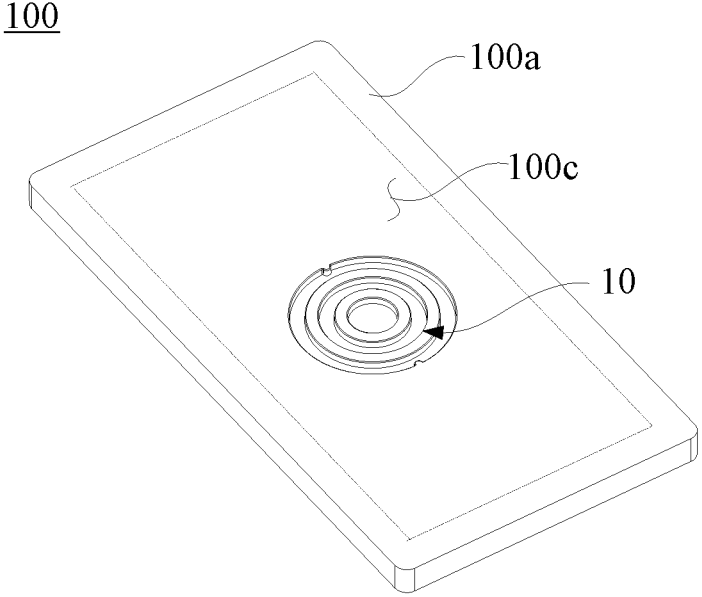
FIG. 2 is a schematic structural view of the back of the mobile terminal shown in FIG. 1.
Figure 3:
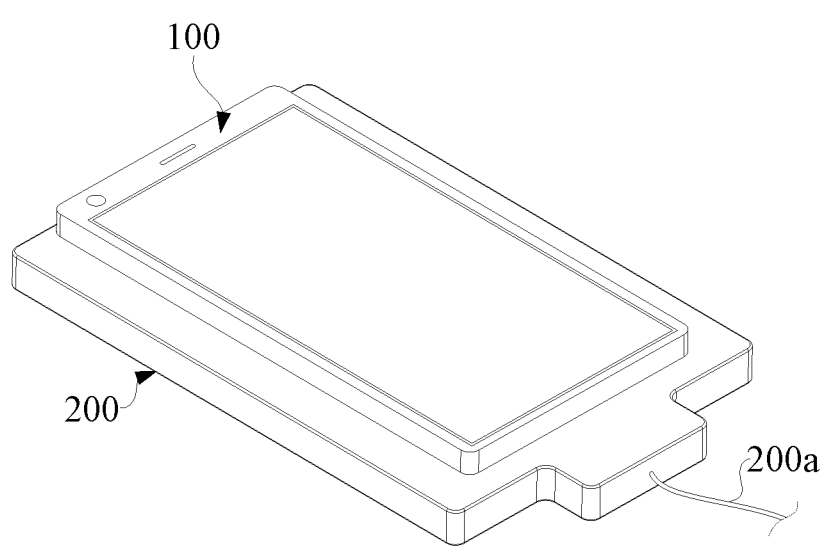
FIG. 3 is a schematic view of the mobile terminal and the charging device shown in FIG. 1 in an engaged state.

Referring to FIGS. 1 to 3, the first electronic device may be an electronic device such as a mobile terminal 100, and the second electronic device may be a charging device 200 for charging the first electronic device. The charging device 200 may be a device capable of storing energy itself, such as a portable power source, or a device for charging the first electronic device engaged with it from an external power supply, such as an adapter.

When it is necessary to charge the mobile terminal 100, one of the female connecting member 10 and the male connecting member 20 is disposed in the charging device 200 such as a charging adapter, and the other of the female connecting member 10 and the male connecting member 20 is disposed in the mobile terminal 100, so that the connection between the mobile terminal 100 and the charging device 200 is realized by engaging the male connecting member 20 with the female connecting member 10 so as to charge the mobile terminal 100.

The mobile terminal 100 includes a back shell 100a and a display screen 100b, and the female connecting member 10 or the male connecting member 20 is disposed in the back shell 100a. As shown in FIGS. 1 and 2, the back shell 100a of the mobile terminal 100 is provided with the female connecting member 10, and correspondingly, the charging device 200 is provided with the male connecting member 20 that can be engaged with the female connecting member 10. When the charging device 200 is required to charge the mobile terminal 100 from an external power supply, the charging device 200 also at least has an electrical input terminal connected to the male connecting member 20. The electrical input terminal can be connected to the power supply via an electrical connection line 200a such as a conductive line, a data line, etc.

In an embodiment, the back shell 100a has a flat plate portion 100c facing away from the display screen 100b of the mobile terminal 100, and the flat plate portion 100c is provided with the female connecting member 10 or the male connecting member 20. Therefore, because there is a large flat area in the flat plate portion 100c to dispose the female connecting member 10 or the male connecting member 20, the arrangement space for the contacts can be increased.

The connector is not limited to the above-mentioned connection between the mobile terminal 100 and the charging device 200, and any connection that realizes functions such as current or data transmission can be realized by using the connector. For example, the male connecting member 20 or the female connecting member 10 of the connector can be used as a connection terminal of a data line, enabling the data line to be connected with an adapter or a mobile terminal. It is also possible to dispose the male connecting member 20 and the female connecting member 10 at two ends of a data line respectively, which will not be described in detail here.

Figure 4:
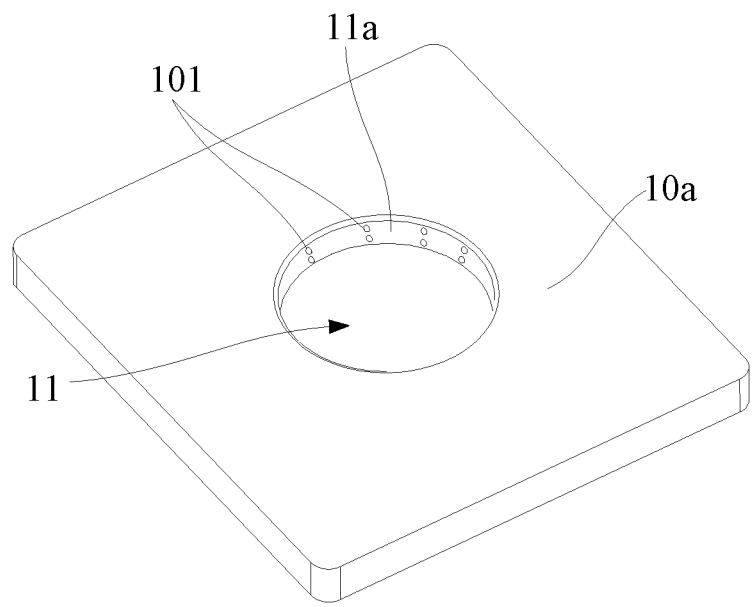
FIG. 4 is a schematic structural view of a female connecting member in an embodiment.
Figure 5:
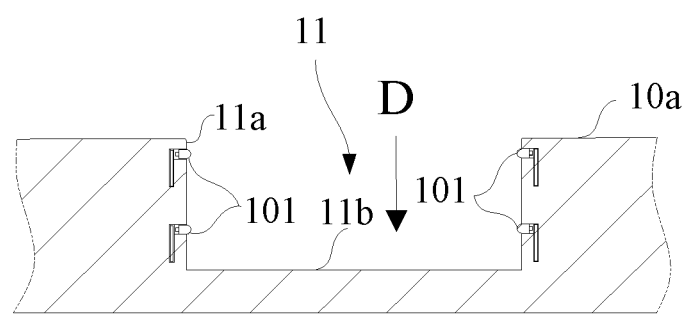
FIG. 5 is a schematic cross-sectional view of the female connecting member shown in FIG. 4.
Figure 6:
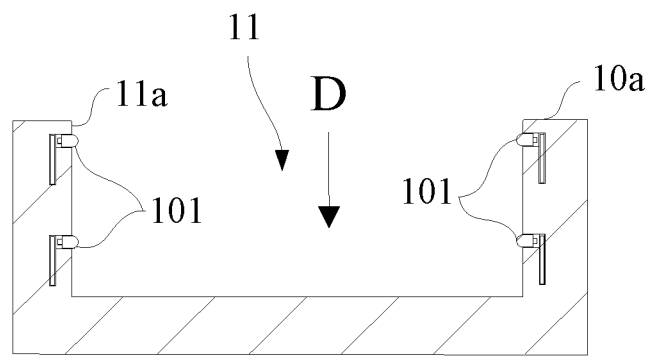
FIG. 6 is a schematic cross-sectional view of a female connecting member of another embodiment.

Referring to FIGS. 4 and 5, in an embodiment, the female connecting member 10 has a first end face 10a, the first end face 10a has a first groove 11, and the first groove 11 includes a first side face 11a and a first bottom face 11b encompassed by the first side face 11a. The first end face 10a may be a larger face as shown in FIG. 4 or a narrower face as shown in FIG. 6. In other words, in FIG. 6, the first groove 11 has a thinner wall thickness. For example, when a sheet is wound to form the first groove 11, the thickness of the sheet is the wall thickness of the first groove 11, that is, the width of the first end face 10a, which can be 0.5 mm. The first groove 11 may also be formed by laser engraving process, and is not limited here. The first side face 11a is provided with a plurality of contacts 101, for example, N*M contacts 101, where N and M are both integers greater than or equal to 2. The contacts 101 are distributed in N rows along the depth direction of the first groove 11 (refer to the direction indicated by arrow D in FIGS. 5 and 6). In the female connecting member 10 shown in FIGS. 4 to 6, the first side face 11a is provided with two rows of contacts 101 in the depth direction of the first groove 11. Each row includes M contacts 101 distributed along the circumferential direction of the first side face 11a. In this way, more contacts 101 can be provided in the first side face 11a, thereby satisfying functional requirements such as fast charging or large-amount data transmission.

In an embodiment, X contacts of the M contacts 101 located in the same row are arranged in parallel, where X is an integer greater than 1 and less than or equal to M. Therefore, as long as not all of these contacts 101 arranged in parallel fail, even if some of the contacts 101 fail, other contacts 101 arranged in parallel can be substituted, thus the realization of their corresponding functions will not be affected.

In an embodiment, the contacts 101 are distributed in N rows and M columns in the form of a dot matrix in the first side face 11a, and by this arrangement, the positions of the contacts 101 in the first side face 11a can be relatively coordinated and regular, which is convenient to set.

In addition, when N is an integer greater than or equal to 3 and M is an integer greater than or equal to 3, N contacts 101 located in the same column are equally spaced and M contacts 101 located in the same row are equally spaced. In this way, the contacts 101 are uniformly distributed in the first side face 11a, making full use of the arrangement space of the first side face 11a. Moreover, this uniform arrangement facilitates the arrangement of the contacts 101 at corresponding positions, realizes the transmission of current or data, and avoids the contacts 101 from being irregularly distributed in the first side face 11a of the first groove 11 and thus easily causing the contacts 101 to be connected with wrong circuits and failing to realize corresponding functions.

The first groove 11 may be an annular groove so as to have side faces at both sides of the first bottom face 11b in order to provide more contacts 101. The cross-sectional shape of the annular groove may be circular, triangular, quadrangular, hexagonal, etc., which are not limited here.

Figure 7:
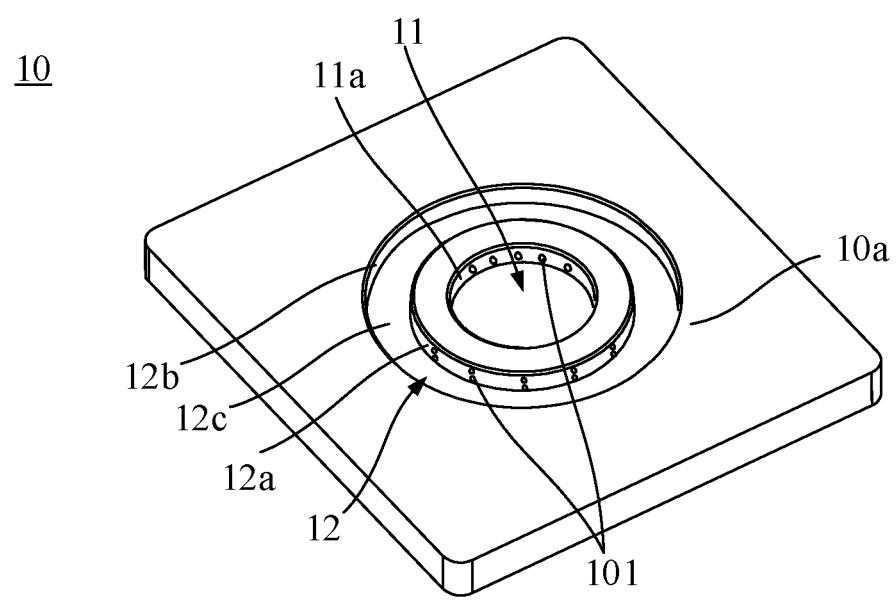
FIG. 7 is a schematic structural view of a female connecting member in another embodiment.

As shown in FIG. 7, a second groove 12 is annularly disposed around the periphery of the first groove 11. The second groove 12 includes a second side face 12a, a second bottom face 12c and a third side face 12b, wherein the second side face 12a and the third side face 12b are facing towards each other and connected by the second bottom face 12c, and the second side face 12a and the first side face 11a are facing away from each other and connected by the first end face 10a. The second side face 12a is provided with P*Q contacts 101, wherein P is an integer greater than or equal to 2, and Q is an integer greater than or equal to 2. Thus, more contacts 101 can be provided using the second side face 12a of the second groove 12.

Figure 12:
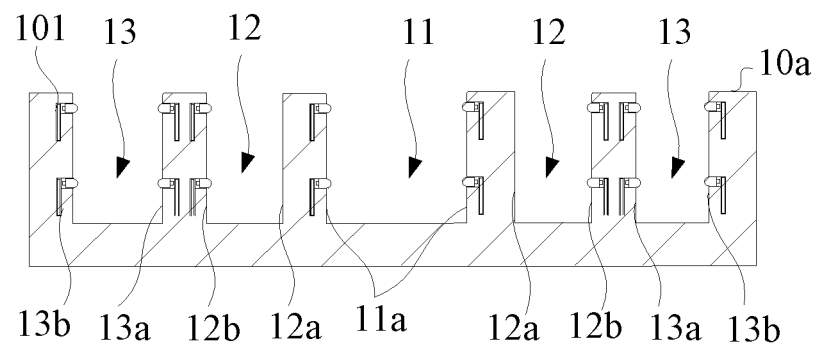
FIG. 12 is a schematic cross-sectional view of a female connecting member in another embodiment.

In other embodiments, as shown in FIGS. 7 and 12, a second groove 12 is annularly disposed around the periphery of the first groove 11. The second groove 12 includes a second side face 12a, a second bottom face 12c and a third side face 12b, wherein the second side face 12a and the third side face 12b are facing towards each other and connected by the second bottom face 12c, and the second side face 12a and the first side face 11a are facing away from each other and connected by the first end face 10a. The third side face 12b is provided with E*F contacts 101, wherein E is an integer greater than or equal to 2, and F is an integer greater than or equal to 2.

Figure 11:
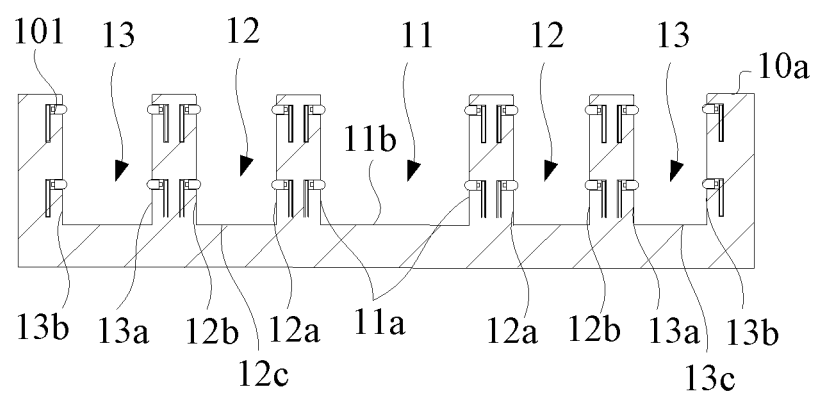
FIG. 11 is a schematic cross-sectional view of a female connecting member in another embodiment.
Figure 13:
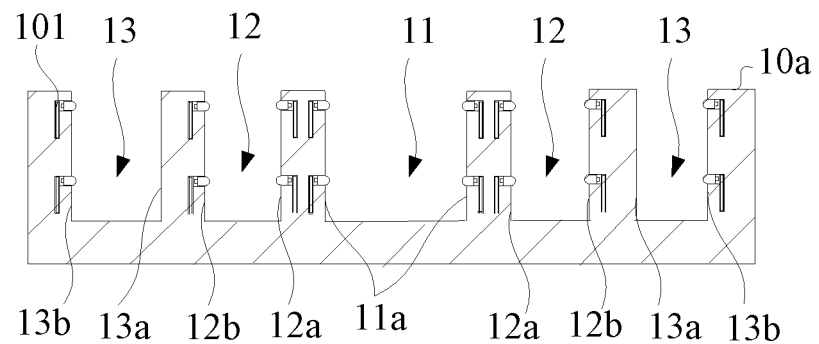
FIG. 13 is a schematic cross-sectional view of a female connecting member in another embodiment.

In some embodiments, as shown in FIGS. 11 and 13, both the second side face 12a and the third side face 12b are provided with the contacts 101. For example, the second side face 12a is provided with P*Q contacts 101, wherein P is an integer greater than or equal to 2, and Q is an integer greater than or equal to 2. The third side face 12b is provided with E*F contacts 101, wherein E is an integer greater than or equal to 2, and F is an integer greater than or equal to 2. The number of contacts 101 in the second side face 12a and the third side face 12b may be equal or unequal.

In an embodiment, the numbers of contacts 101 in the first side face 11a, the second side face 12a and the third side face 12b are the same. The contacts 101 in the first side face 11a, the second side face 12a and the third side face 12b can be uniformly distributed in rows and columns in the same distribution manner. Reference can be made to the distribution manner of N*M contacts 101 in the first side face 11a, which is not repeated here.

Of course, the contacts 101 in the second side face 12a and the third side face 12b can also be arranged in parallel respectively, so as to realize functions such as data or current transmission by using a plurality of contacts 101. Therefore, when the contacts are arranged in parallel, even if some of the contacts 101 fail, the connection effect of the female connecting member 10 will not be affected and corresponding functions can still be realized.

Figure 10:
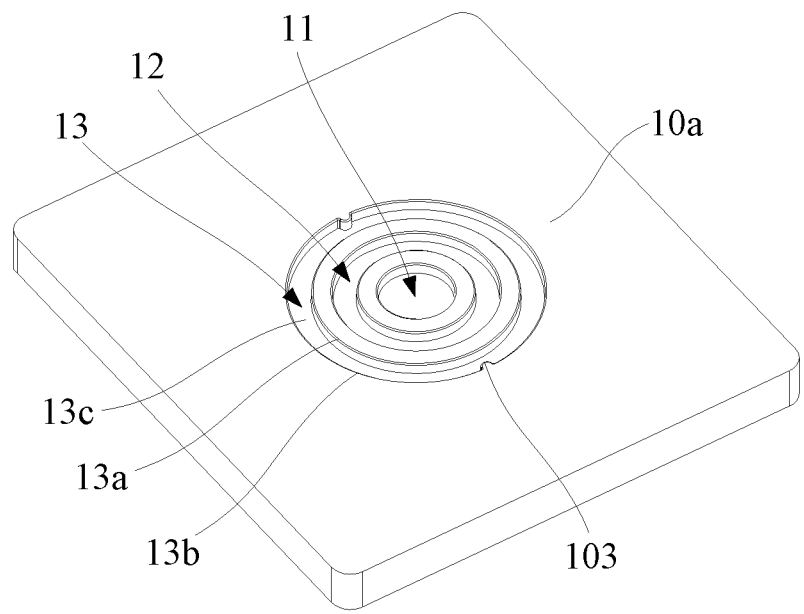
FIG. 10 is a schematic structural view of a female connecting member in another embodiment.

The number of grooves can be set according to actual needs to provide more arrangement space to arrange the contacts 101 and realize functions such as current transmission or data transmission. For example, as shown in FIG. 10, the second groove 12 is annularly disposed around the periphery of the first groove 11, and a third groove 13 is annularly disposed around the periphery of the second groove 12. Therefore, more contacts 101 can be arranged by using the third groove 13, and different connecting functions can be distinguished by using different grooves. For example, the contacts 101 arranged in the second groove 12 are used for transmitting current, and the contacts 101 arranged in the third groove 13 are used for transmitting data, so that when some of functional connections fail, the position of the abnormal contact 101 can be quickly located for maintenance.

Referring to FIGS. 11 to 13, the third groove 13 includes a fourth side face 13a, a third bottom face 13c, and a fifth side face 13b, wherein the fourth side face 13a and the fifth side face 13b are facing towards each other and connected by the third bottom face 13c, and the fourth side face 13a and the third side face 12b are facing away from each other and connected by the first end face 10a.

In an embodiment, the fourth side face 13a is provided with R*S contacts 101, wherein R is an integer greater than or equal to 2, and S is an integer greater than or equal to 2. Thus, more contacts 101 can be provided using the fourth side face 13a of the third groove 13. In another embodiment, the fifth side face 13b is provided with J*K contacts 101, wherein J is an integer greater than or equal to 2, and K is an integer greater than or equal to 2.

In some embodiments, both the fourth side face 13a and the fifth side face 13b are provided with the contacts 101. The fourth side face 13a is provided with R*S contacts 101, wherein R is an integer greater than or equal to 2, and S is an integer greater than or equal to 2. The fifth side face 13b is provided with J*K contacts 101, where J is an integer greater than or equal to 2 and K is an integer greater than or equal to 2. The number of contacts 101 in the fourth side face 13a and the fifth side face 13b may be equal or unequal.

In an embodiment, the contacts 101 in the fourth side face 13a and the fifth side face 13b can be arranged in the same manner as the contacts 101 in the first side face 11a, and are uniformly distributed in rows and columns. Reference can be made to the distribution manner of the N*M contacts 101 in the first side face 11a, which will not be repeated here.

Of course, the contacts 101 in the fourth side face 13a and the fifth side face 13b can also be arranged in parallel respectively, so as to realize functions such as data or current transmission by using a plurality of contacts 101. In this parallel arrangement, even if some of the contacts 101 fail, the connection effect of the female connecting member 10 will not be affected and corresponding functions can still be realized.

In an embodiment, the first groove 11, the second groove 12 and the third groove 13 are all circular ring-shaped grooves, and the centers of the circular ring-shaped grooves are the same, so that when the female connecting member 10 is engaged with the male connecting member 20, the operation can be convenient and fast using the circular ring-shaped grooves.

Figure 8:
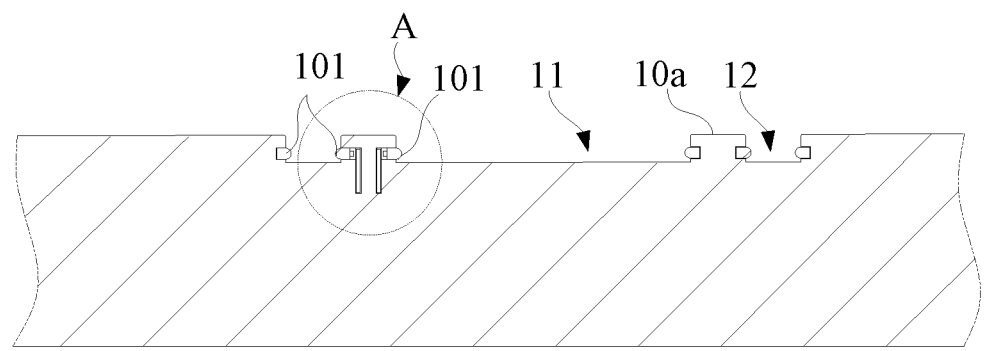
FIG. 8 is a schematic cross-sectional view of the female connecting member shown in FIG. 7.
Figure 9:
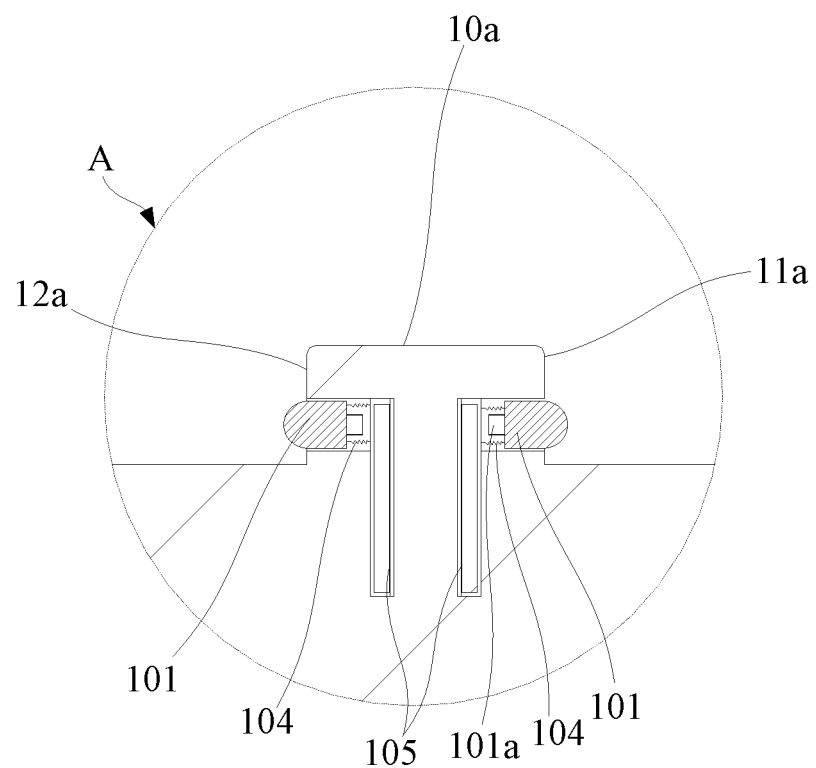
FIG. 9 is an enlarged view of a circle A in FIG. 8.

Referring to FIGS. 8 and 9, in an embodiment, the female connecting member 10 is provided with contact pieces 105 corresponding to the contacts 101, and the contact piece 105 may be a metal sheet with good electrical conductivity. A spring 104 is provided between the contact 101 and the corresponding contact piece 105. When the male connecting member 20 is not engaged with the female connecting member 10, the spring 104 can drive the contact 101 away from the corresponding contact piece 105. That is to say, when the female connecting member 10 is not in use, the contact 101 in the female connecting member 10 and the corresponding contact piece 105 are electrically disconnected, that is, current or data cannot be transmitted, in other words, the contact 101 at this time is not charged, so it is not easy to cause problems such as electric shock or short circuit due to erroneous contact. When the male connecting member 20 is engaged with the female connecting member 10, the male connecting member 20 can drive the contact 101 to press against the spring 104 and contact the corresponding contact piece 105. That is, only when the male connecting member 20 is engaged with the female connecting member 10 will the contact 101 contact the corresponding contact piece 105, thus enabling data or current to be transmitted between the male connecting member 20 and the female connecting member 10.

In an embodiment, as shown in FIG. 9, the contact 101 is provided with a stepped portion 101a, and the spring 104 elastically abuts between the stepped portion 101a and the contact piece 105. The provision of the stepped portion 101a, on the one hand, facilitates the abutment against the spring 104, and on the other hand, reduces the occupied space of the contact 101 so as to reserve a corresponding space for setting the spring 104. The spring 104 may be an insulating spring, so as to avoid erroneous contact with the contact 101 causing conductive abnormality.

Figure 14:
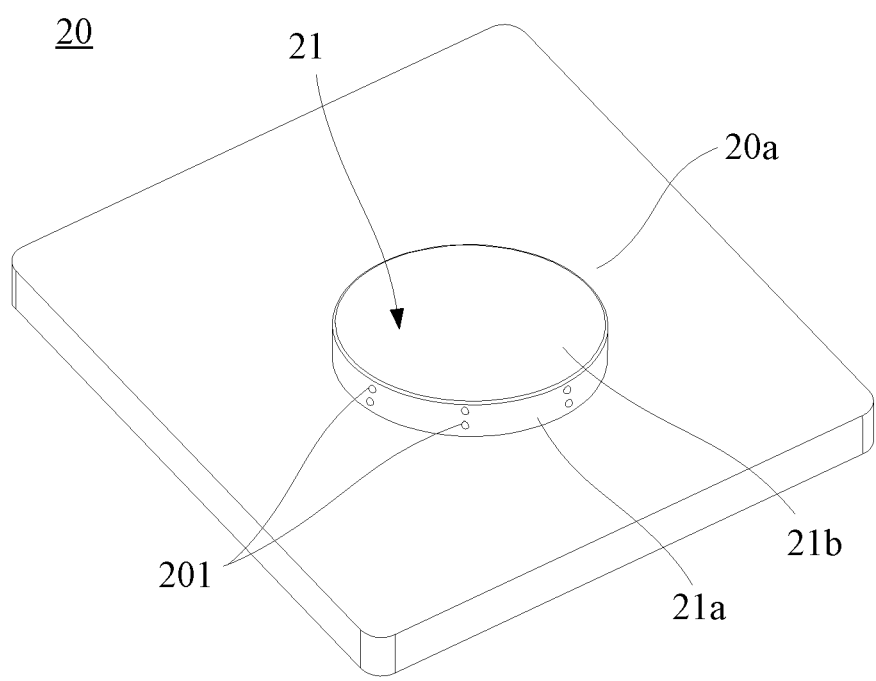
FIG. 14 is a schematic structural view of a male connecting member in an embodiment.

As shown in FIG. 14, in an embodiment, the male connecting member 20 has a first bottom face 20a, and the first bottom face 20a is provided with a first boss 21. The first boss 21 includes a first side faces 21a and a first top faces 21b encompassed by the first side face 21a. The first side face 21a is provided with a plurality of contacts 201, e.g., N*M contacts 201, where N and M are both integers greater than or equal to 2. The contacts 201 are arranged in N rows along the height direction of the first boss 21 (referring to the direction indicated by arrow H in FIG. 17). In the male connecting member 20 shown in FIG. 14, the first side face 21a is provided with two rows of contacts 201 in the height direction of the first boss 21. Each row includes M contacts 201 distributed along the circumferential direction of the first side face 21a. In this way, more contacts 201 can be provided in the first side face 21a, thereby satisfying functional requirements such as fast charging or large amount data transmission.

The contacts 201 in the first side face 21a may be arranged in parallel or in series, for example, X contacts of the M contacts 201 located in the same row are arranged in parallel, where X is an integer greater than 1 and less than or equal to M. Therefore, as long as not all of these contacts 201 arranged in parallel fail, even if some of the contacts 201 fail, other contacts 201 arranged in parallel can be substituted, thus the realization of their corresponding functions will not be affected.

In an embodiment, the contacts 201 are distributed in N rows and M columns in the form of a dot matrix in the first side face 21a. By this arrangement, the positions of the contacts 201 in the first side face 21a can be relatively coordinated and regular, which is convenient to set.

In addition, when N is an integer greater than or equal to 3 and M is an integer greater than or equal to 3, the contacts 201 in the first side face 21a may be arranged in such a distribution manner that N contacts 201 located in the same column are equally spaced and M contacts 201 located in the same row are equally spaced. In this way, the contacts 201 are uniformly distributed in the first side face 21a, and the arrangement space of the first side face 21a is fully utilized. Moreover, this uniform arrangement facilitates the contacts 201 to be arranged at corresponding positions to realize the transmission of current or data, and avoids the contacts 201 being irregularly distributed in the first side face 21a of the first boss 21 and thus easily causing the contacts 201 to be connected with wrong circuits and failing to realize corresponding functions.

The first boss 21 may be an annular boss so as to have side faces located at both sides of the first top face 21b so as to provide more contacts 201. The cross-sectional shape of the annular boss may be circular, triangular, quadrangular, hexagonal, etc., which are not limited here.

Referring to FIGS. 4 and 14, when the male connecting member 20 and the female connecting member 10 are engaged with each other in a use state, the first boss 21 can be embedded in the first groove 11, and the contacts 201 in the first side face 21a of the first boss 21 and the contacts 201 in the first side face 11a of the first groove 11 can be in one-to-one correspondence and contact with each other, thereby conducting corresponding functional circuits and realizing functions such as data transmission or current transmission.

Figure 15:
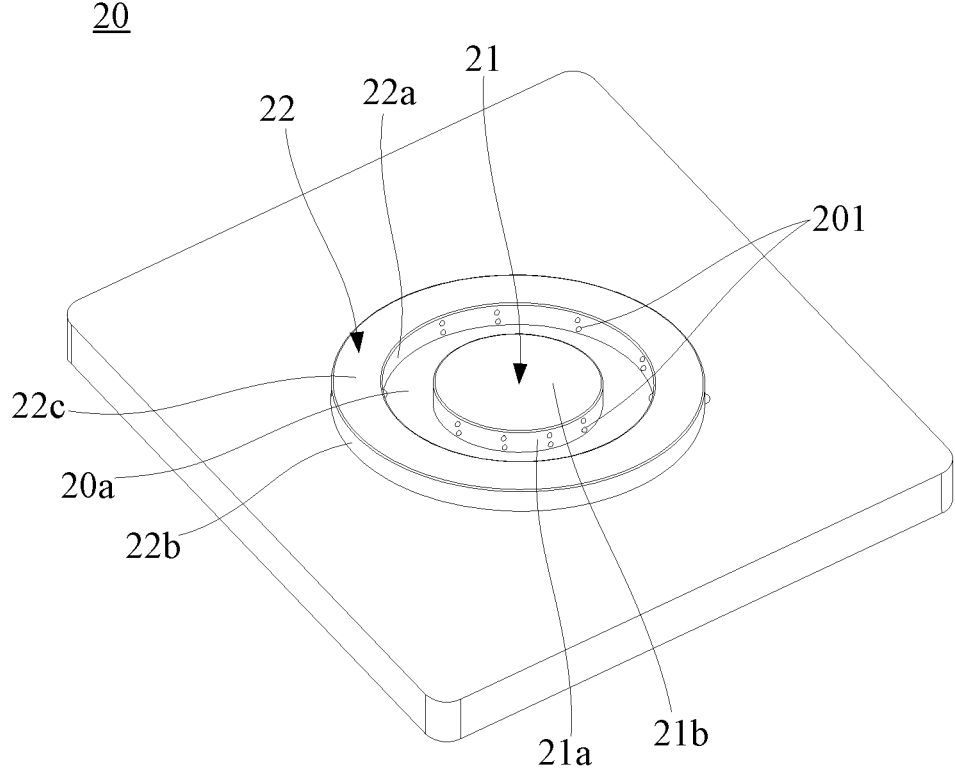
FIG. 15 is a schematic structural view of a male connecting member in another embodiment.
Figure 17:
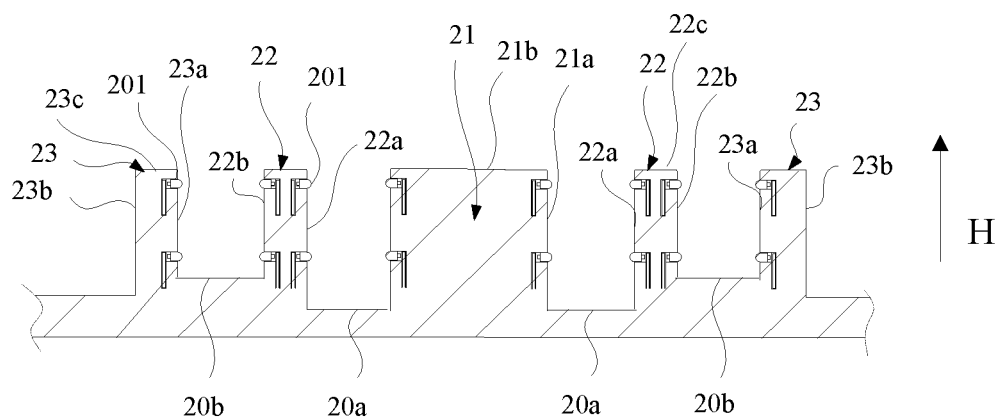
FIG. 17 is a schematic structural view of a male connecting member in a another embodiment.

The male connecting member 20 is not limited to the structural form exemplified in the above embodiment. For example, as shown in FIGS. 15 and 17, in an embodiment, a second boss 22 is annularly disposed around the periphery of the first boss 21. The second boss 22 includes a second side face 22a, a second top face 22c and a third side face 22b. Wherein the second side face 22a and the third side face 22b are facing away from each other and connected by the second top face 22c, and the second side face 22a and the first side face 21a are facing towards each other and connected by the first bottom face 20a. Therefore, the second side face 22a and the third side face 22b can be provided with the contacts 201 to meet the needs of large-flow data transmission and improve the transmission efficiency.

In an embodiment, only the second side face 22a is provided with the contacts 201. For example, the second side face 22a is provided with P*Q contacts 201, wherein P is an integer greater than or equal to 2, and Q is an integer greater than or equal to 2. It is also possible to provide the contacts 201 only in the third side face 22b. For example, the third side face 22b is provided with E*F contacts 201, wherein E is an integer greater than or equal to 2, and F is an integer greater than or equal to 2. It is also possible to provide the contacts 201 in both the second side face 22a and the third side face 22b. For example, the second side face 22a is provided with P*Q contacts 201, wherein P is an integer greater than or equal to 2, and Q is an integer greater than or equal to 2; the third side face 22b is provided with E*F contacts 201, wherein E is an integer greater than or equal to 2, and F is an integer greater than or equal to 2. The number of contacts 201 in the second side face 22a and the third side face 22b may be equal, i.e., P*Q is equal to E*F. The second side face 22a and the third side face 22b may be provided with different numbers of contacts 201 according to actual needs, which will not be described in detail here.

In an embodiment, the numbers of contacts 201 in the first side face 21a, the second side face 22a, and the third side face 22b are the same. The contacts 201 in the first side face 21a, the second side face 22a, and the third side face 22b can be uniformly distributed in rows and columns in the same distribution manner. Reference can be made to the distribution manner of N*M contacts 201 in the first side face 21a, which will not be repeated here.

The contacts 201 in the second side face 22a and the third side face 22b can also be arranged in parallel, respectively, so as to realize functions such as data or current transmission by using a plurality of contacts 201. Meanwhile, when the contacts 201 are arranged in parallel, even if some of the contacts 201 fail, the connection effect of the male connecting member 20 will not be affected, and corresponding functions will be realized.

Figure 16:
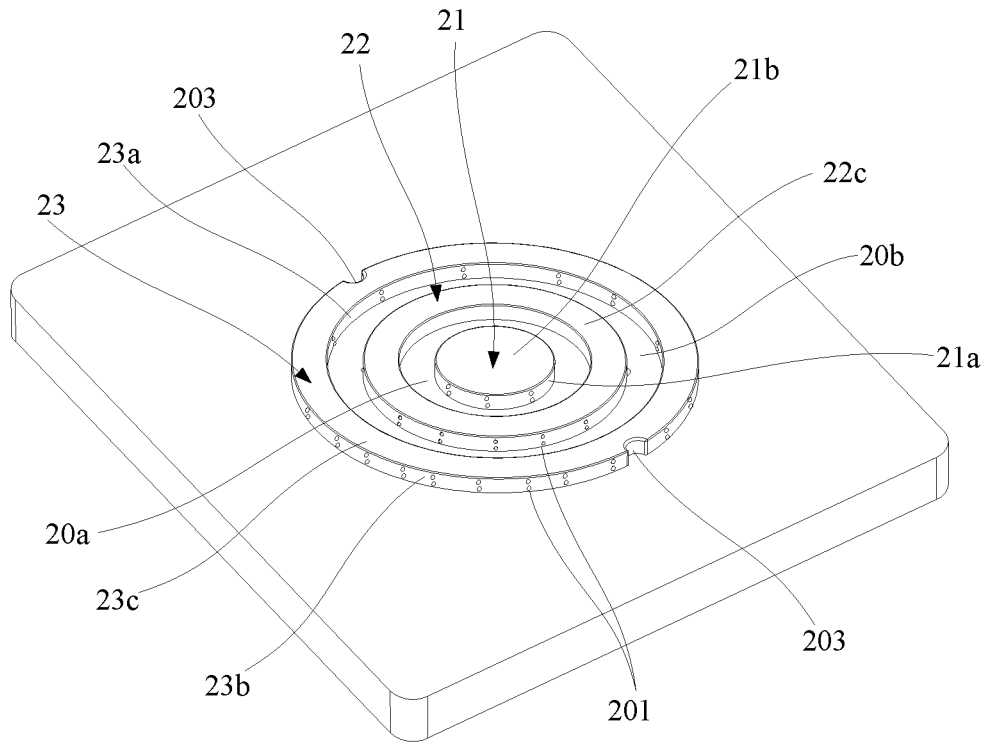
FIG. 16 is a schematic structural view of a male connecting member in yet another embodiment.

The number of bosses can be set according to actual needs so as to provide more arrangement space to set the contacts 201 and realize functions such as current transmission or data transmission. For example, as shown in FIG. 16, a second boss 22 is annularly disposed around the periphery of the first boss 21, and a third boss 23 is annularly disposed around the periphery of the second boss 22. Therefore, more contacts 201 can be provided by using the third boss 23, and different connecting functions can be distinguished by using different bosses. For example, the contacts 201 provided in the second boss 22 are used for transmitting current, and the contacts 201 provided in the third boss 23 are used for transmitting data, so that when some functional connections fail, the position of the abnormal contact 201 can be quickly located for maintenance.

As shown in FIGS. 16 and 17, the male connecting member 20 has a second bottom face 20b. It should be understood that the second bottom face 20b may be in the same plane as the first bottom face 20a, or the second bottom face 20b and the first bottom face 20a may be in different planes respectively. As shown in FIG. 17, in the height direction of the first boss 21, the second bottom face 20b and the first bottom face 20a are in different planes. In detail, the second bottom face 20b is higher than the first bottom face 20a, which is not limited here. Referring to FIGS. 16 and 17, the third boss 23 includes a fourth side face 23a, a third top face 23c, and a fifth side face 23b. Wherein the fourth side face 23a and the fifth side face 23b are facing away from each other and connected by the third top face 23c. The fourth side face 23a and the third side face 22b are facing towards each other and connected by the second bottom face 20b. Therefore, the fourth side face 23a and the fifth side face 23b can be provided with the contacts 201 to meet the needs of large-flow data transmission and improve the transmission efficiency.

In an embodiment, only the fourth side face 23a is provided with the contacts 201. For example, the fourth side face 23a is provided with R*S contacts 201, wherein R is an integer greater than or equal to 2, and S is an integer greater than or equal to 2. Thus, more contacts 201 can be provided using the fourth side face 23a of the third boss 23. In another embodiment, only the fifth side face 23b is provided with the contacts 201, and the fifth side face 23b is provided with J*K contacts 201, where J is an integer greater than or equal to 2 and K is an integer greater than or equal to 2.

In some embodiments, both the fourth side face 23a and the fifth side face 23b are provided with contacts 201. The fourth side face 23a is provided with R*S contacts 201, wherein R is an integer greater than or equal to 2, and S is an integer greater than or equal to 2. The fifth side face 23b is provided with J*K contacts 201, wherein J is an integer greater than or equal to 2 and K is an integer greater than or equal to 2. The number of contacts 201 in the fourth side face 23a and the fifth side face 23b may be equal, i.e., R*S is equal to J*K. The fourth side face 23a and the fifth side face 23b may be provided with different numbers of contacts 201 according to needs, which will not be described in detail here.

In an embodiment, the contacts 201 in the fourth side face 23a and the fifth side face 23b may be arranged in the same manner as the contacts 201 in the first side face 21a, and uniformly distributed in rows and columns. Reference can be made to the distribution manner of the N*M contacts 201 in the first side face 21a, which will not be repeated here.

Of course, the contacts 201 in the fourth side face 23a and the fifth side face 23b can also be arranged in parallel, respectively, so as to realize functions such as data or current transmission by using a plurality of contacts 201. In this way, even if some of the contacts 201 fail, the connection effect of the male connecting member 20 will not be affected and corresponding functions can still be realized.

In an embodiment, the first boss 21, the second boss 22, and the third boss 23 are all circular ring-shaped boss, and the centers of the circular ring-shaped bosses are the same, so that the operation is fast and convenient by using circular ring-shaped bosses when the male connecting member 20 is engaged with the female connecting member 10. In another embodiment, as shown in FIG. 16, the first boss 21 is a truncated cone-shaped boss, and the second boss 22 and the third boss 23 annularly disposed around the periphery of the first boss 21 are circular ring-shaped bosses.

Figure 20:
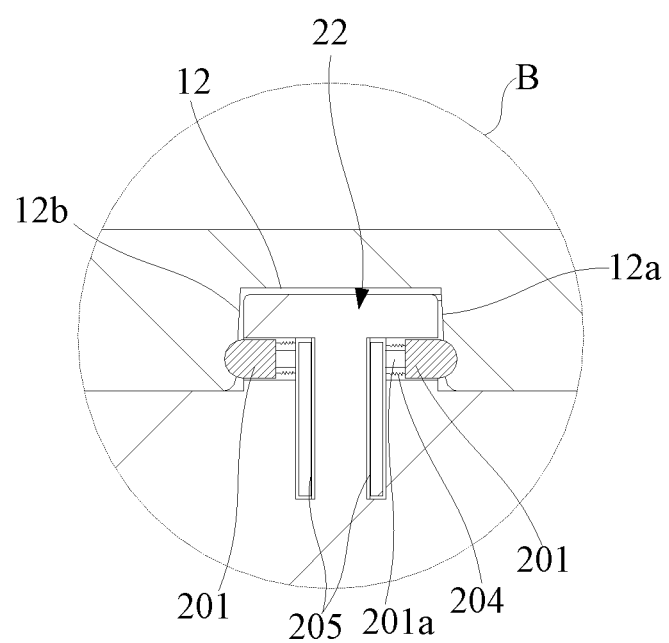
FIG. 20 is an enlarged partial view of a circle B in FIG. 19.

Referring to FIG. 20, the male connecting member 20 is provided with contact pieces 205 corresponding to the contacts 201 in the male connecting member 20. The contact piece 205 may be a metal sheet with good electrical conductivity. A spring 204 is provided between the contact 201 in the male connecting member 20 and the corresponding contact piece 205. When the male connecting member 20 is not engaged with the female connecting member 10, the spring 204 can drive the contact 201 in the male connecting member 20 away from the corresponding contact piece 205, that is, when the male connecting member 20 is not in use, the contacts 201 in the male connecting member 20 and the corresponding contact piece 205 are electrically disconnected, that is, current or data cannot be transmitted, in other words, the contact 201 at this time is not charged, so problems such as electric shock or short circuit are not easily caused due to erroneous contact. When the male connecting member 20 is engaged with the female connecting member 10, the female connecting member 10 can drive the contact 201 in the male connecting member 20 to press against the spring 204 and contact with the corresponding contact piece 205. That is to say, only when the male connecting member 20 is engaged with the female connecting member 10 will the contact 201 of the male connecting member 20 contact the corresponding contact piece 205, thus enabling data or current to be transmitted between the male connecting member 20 and the female connecting member 10.

In an embodiment, as shown in FIG. 20, the contact 201 is provided with a stepped portion 201a, and the spring 204 elastically abuts between the stepped portion 201a and the contact piece 205. The arrangement of the step portion 201a, on the one hand, facilitates the abutment against the spring 204, and on the other hand, reduces the occupied space of the contact 201 so as to reserve a corresponding space for setting the spring 204. The spring 204 can be an insulating spring, so as to avoid erroneous contact with the contact 201 and causing conductive abnormality.

In an embodiment, the female connecting member 10 and the male connecting member 20 are provided with respective limiting structures to limit the two in a connected state by using the limiting structures. The limiting structure can be a limiting projection and a limiting slot which can be snapped and engaged. One of the male connecting member 20 and the female connecting member 10 is provided with the limiting projection, and the other of the male connecting member 20 and the female connecting member 10 is provided with the limiting slot, wherein the limiting slot can be engaged with the limiting projection. In the following, the limiting structure will be further explained by taking the example that the third groove of the female connecting member 10 is provided with the limiting projection and the third boss of the male connecting member 20 is provided with the limiting slot.

Figure 18:
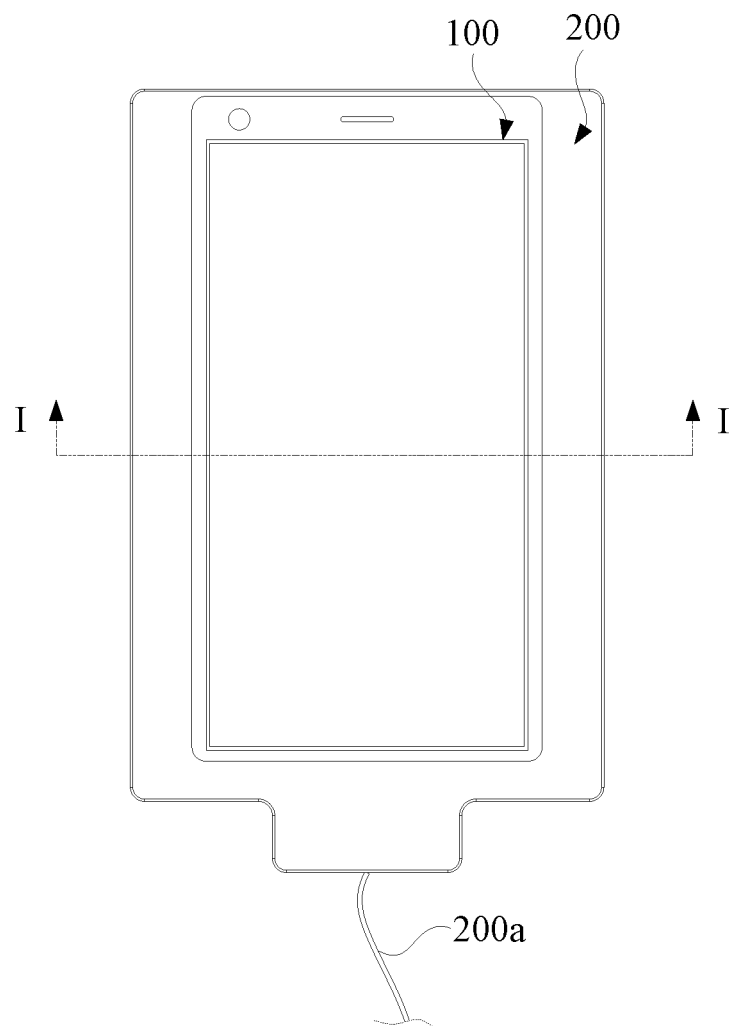
FIG. 18 is a schematic top view of the mobile terminal and the charging device shown in FIG. 1 in an engaged state.
Figure 19:
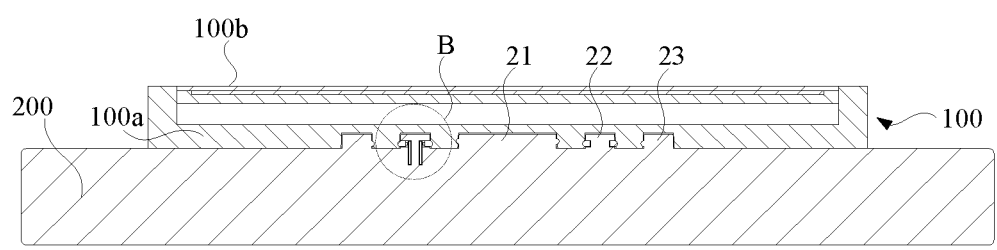
FIG. 19 is a schematic sectional structural view taken along line I-I in FIG. 18.

Referring to FIGS. 10 and 16, the female connecting member 10 includes the first groove 11, the second groove 12, and the third groove 13. The male connecting member 20 engageable with the female connecting member 10 includes the first boss 21, the second boss 22, and the third boss 23. Referring to FIGS. 18 and 19, when the female connecting member 10 and the male connecting member 20 are engaged with each other in use, the first boss 21 is embedded in the first groove 11, the second boss 22 is embedded in the second groove 12, and the third boss 23 is embedded in the third groove 13. At this time, the first side face 11a and the first side face 21a are facing towards each other, the second side face 12a and the second side face 22a are facing towards each other, the third side face 12b and the third side face 22b are facing towards each other, the fourth side face 13a and the fourth side face 23a are facing towards each other, and the fifth side face 13b and the fifth side face 23b are facing towards each other. Correspondingly, enough contacts can be arranged in a pair of facing side face and side face to realize the electrical connection between the male connecting member 20 and the female connecting member 10 in order to transmit current or data. For example, the first side face 11a and the first side face 21a are provided with contacts in one to one correspondence, so that when the male connecting member 20 and the female connecting member 10 are engaged, the contacts 101 in the first side face 11a and the contacts 201 in the first side face 21a are contact and connected in one-to-one correspondence, thereby realizing corresponding electrical connection. Correspondingly, when the male connecting member 20 and the female connecting member 10 include a plurality of pairs of bosses and grooves which can be engaged with each other, more contacts can be arranged in the above-mentioned arrangement way to meet the requirement of large-flow data transmission, which will not be repeated here.

The limiting projection 103 and the limiting slot 203 can be arranged in a pair of facing side face and side face, and the number of the limiting projections 103 and the limiting slots 203 can be one or two or more, which is not limited here. Taking the female connecting member 10 and the male connecting member 20 shown in FIGS. 10 and 16 as an example, the fifth side face 13b is provided with the limiting projection 103, and the fifth side face 23b is provided with the limiting slot 203, so that when the female connecting member 10 is engaged with the male connecting member 20, the limiting projection 103 located in the fifth side face 13b can be engaged with the limiting slot 203 located in the fifth side face 23b, thereby limiting the relative rotation of the female connecting member 10 and the male connecting member 20, and effectively maintaining the two in a state capable of realizing electrical connection to transmit data or current.

Figure 21:
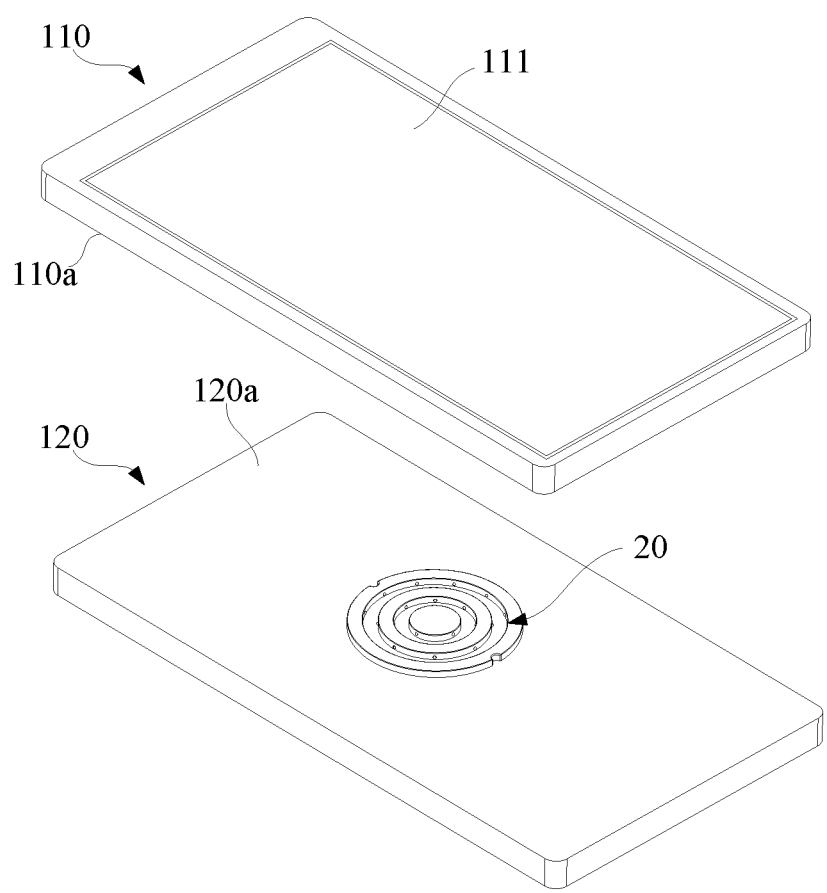
FIG. 21 is a schematic structural view of a mobile terminal according to an embodiment.

Referring to FIG. 21, the present disclosure also provides a mobile terminal 100, which includes a host terminal 120 and a display terminal 110, wherein the host terminal 120 includes a processor, a first battery and a mainboard, and both the processor and the first battery are connected with the mainboard; the display terminal 110 includes a display screen 111 and a second battery, and the display screen 111 and the second battery are connected. The display terminal 110 can be detachably mounted on the host terminal 120. The host terminal 120 includes a connecting portion. The display terminal 110 includes an engaging portion that can be engaged with the connecting portion. When the display terminal 110 is mounted in the host terminal 120, the connecting portion engages with the engaging portion to transmit data or current between the host terminal 120 and the display screen 111.

In the mobile terminal, the display terminal 110 can be detached from the host terminal 120 for use, so that the display terminal 110 with the display screen 111 can be made thinner and lighter for hand-held use, and the user experience can be effectively improved. It should be understood that the host terminal 120 includes a first wireless communication unit, and the display terminal 110 includes a second wireless communication unit. In a state where the display terminal 110 is detached from the host terminal 120, the host terminal 120 and the display terminal 110 can be communicatively connected by the first wireless communication unit and the second wireless communication unit, so that a user can operate the mobile terminal only by holding the display terminal 110, and the thinner display terminal 110 can avoid fatigue of the user when the user holds the mobile terminal for a long time. Both the first wireless communication unit and the second wireless communication unit are Bluetooth units, or alternatively both the first wireless communication unit and the second wireless communication unit are WIFI units, which are not limited here.

One of the connecting portion and the engaging portion is the female connecting member 10 and the other is the male connecting member 20. In this way, more contacts can be used for large-flow data transmission, thus improving the data transmission efficiency. It is also possible to transmit large current in this way, so that when the display terminal 110 is installed at the host terminal 120, the first battery of the host terminal 120 can rapidly charge the second battery, effectively prolonging the endurance of the display terminal 110 when it is detached for use.

In an embodiment, the host terminal 120 includes a second housing 120a, and the display terminal 110 includes a first housing 110a. When the display terminal 110 is engaged with the host terminal 120, the first housing 110a can be attached to the second housing 120a; One of the female connecting member 10 and the male connecting member 20 is disposed in the side of the second housing 120a facing the display screen 111, and the other is disposed in the side of the first housing 110a facing the host terminal 120, so that when the display terminal 110 is engaged with the host terminal 120, the male connecting member 20 can be engaged with the female connecting member 10 to transmit data or current between the display terminal 110 and the host terminal 120.

The technical features of the above-mentioned embodiments can be combined in any way. In order to simplify the description, not all possible combinations of the technical features of the above-mentioned embodiments have been described. However, as long as there is no contradiction in the combination of these technical features, it should be considered as the scope recorded in this specification.

The above-mentioned examples only express several embodiments of the present disclosure, and their descriptions are more specific and detailed, but they should not be construed as limiting the scope of disclosure patents. It should be pointed out that, for those of ordinary skill in the art, several modifications and improvements can be made without departing from the concept of the present disclosure, which are all within the scope of protection of the present disclosure. Therefore, the scope of protection of the present disclosure patent shall be subject to the appended claims.

What is claimed is:

1. A female connecting member, wherein the female connecting member comprises a first end face, the first end face has a first groove, the first groove is defined by a first side face and a first bottom face encompassed by the first side face, the first side face are provided with N*M contacts, the contacts are arranged in N rows along a depth direction of the first groove, N is an integer greater than or equal to 2, each row comprises M contacts distributed along a circumferential direction of the first side face, and M is an integer greater than or equal to 2;
    wherein a second groove is annularly disposed around the periphery of the first groove, and the second groove is defined by a second side face, a second bottom face, and a third side face, wherein the second side face and the third side face are facing towards each other and connected by the second bottom face, and the second side face and the first side face are facing away from each other and connected by the first end face; and
    wherein the second side face is provided with P*Q contacts, wherein P is an integer greater than or equal to 2, and Q is an integer greater than or equal to 2; or, the third side face is provided with E*F contacts, wherein E is an integer greater than or equal to 2, and F is an integer greater than or equal to 2.

2. The female connecting member according to claim 1, wherein the first groove is an annular groove.

3. The female connecting member according to claim 1, wherein the N*M contacts are distributed in N rows and M columns in the first side face.

4. The female connecting member according to claim 1, wherein X contacts of the M contacts located in the same row are arranged in parallel, and X is an integer greater than 1 and less than or equal to M.

5. The female connecting member according to claim 1, wherein a third groove is annularly disposed around the periphery of the second groove, and the third groove is defined by a fourth side face, a third bottom face, and a fifth side face, wherein the fourth side face and the fifth side face are facing towards each other and connected by the third bottom face, and the fourth side face and the third side face are facing away from each other and connected by the first end face; and
    wherein the fourth side face is provided with R*S contacts, wherein R is an integer greater than or equal to 2, and S is an integer greater than or equal to 2; or, the fifth side face is provided with J*K contacts, wherein J is an integer greater than or equal to 2, and K is an integer greater than or equal to 2.

6. The female connecting member according to claim 1, wherein
    the female connecting member is provided with contact pieces corresponding to the contacts in the female connecting member, and a spring is arranged between the contact in the female connecting member and the corresponding contact piece; and
    when a male connecting member is not engaged with the female connecting member, the spring drives the contact in the female connecting member to leave the corresponding contact piece, and when the male connecting member is engaged with the female connecting member, the male connecting member drives the contacts in the female connecting member to press against the spring and contact with the corresponding contact piece.

7. The female connecting member according to claim 6, wherein the contact is provided with a stepped portion, and the spring elastically abuts between the stepped portion and the contact piece.

8. The female connecting member according to claim 1, wherein the depth direction of the first groove is perpendicular to the first end face, the first side face extends inwards from the first end face, the first side face is perpendicular to the first end face, and the first bottom face is perpendicular to the first side face.

9. A male connecting member, wherein
    the male connecting member comprises a first bottom face, the first bottom face is provided with a first boss, and the first boss comprises first side face and a first top face encompassed by the first side face; and
    the first side face is provided with N*M contacts, the contacts are arranged in N rows along a height direction of the first boss, N is an integer greater than or equal to 2, each row comprises M contacts distributed along a circumferential direction of the first boss, and M is an integer greater than or equal to 2.

10. The male connecting member according to claim 9, wherein the first boss is an annular boss.

11. The male connecting member according to claim 9, wherein N*M contacts are distributed in N rows and M columns in the first sie face.

12. The male connecting member according to claim 9, wherein X contacts of the M contacts located in the same row are arranged in parallel, and X is an integer greater than 1 and less than or equal to M.

13. The male connecting member according to claim 9, wherein the first bottom face is provided with a second boss, the second boss is annularly disposed around the periphery of the first boss, the second boss comprises a second side face, a second top face, and a third side face, wherein the second side face and the third side face are facing away from each other and connected by the second top face, and the second side face and the first side face are facing towards each other and connected by the first bottom face; and
    wherein the second side face is provided with P*Q contacts, wherein P is an integer greater than or equal to 2, and Q is an integer greater than or equal to 2; or the third side face is provided with E*F contacts, wherein E is an integer greater than or equal to 2, and F is an integer greater than or equal to 2.

14. The male connecting member according to claim 13, wherein the male connecting member comprises a second bottom face, a third boss is disposed in the second bottom face, the third boss is annularly disposed around the periphery of the second boss, the third boss comprises a fourth side face, a third top face and a fifth side face, wherein the fourth side face and the fifth side face are facing away from each other and connected by the third top face, and the fourth side face and the third side face are facing towards each other and connected by the second bottom face; and wherein the fourth side face is provided with R*S contacts, wherein R is an integer greater than or equal to 2, and S is an integer greater than or equal to 2; or, the fifth side face is provided with J*K contacts, wherein J is an integer greater than or equal to 2, and K is an integer greater than or equal to 2.

15. The male connecting member according to claim 9, wherein the male connecting member is provided with contact pieces corresponding to the contacts in the male connecting member, and a spring is provided between the contact in the male connecting member and the corresponding contact piece; and when the male connecting member is not engaged with a female connecting member, the spring drives the contact in the male connecting member to leave the corresponding contact piece, and when the male connecting member is engaged with a female connecting member, the female connecting member drives the contact in the male connecting member to press against the spring and contact with the corresponding contact piece.

16. The male connecting member according to claim 15, wherein the contact is provided with a stepped portion, and the spring elastically abuts between the stepped portion and the contact piece.

17. The male connecting member according to claim 9, wherein the height direction of the first boss is perpendicular to the bottom face, the first side face extends outwards from the first bottom face, the first side face is perpendicular to the first bottom face, and the first top face is perpendicular to the first side face.

18. A mobile terminal, wherein the mobile terminal comprises a back shell and a female connecting member or a male connecting member, and the female connecting member or the male connecting member is provided in the back shell;

wherein the female connecting member comprises a first end face, the first end face has a first groove, the first groove is defined by a first side face and a first bottom face encompassed by the first side face, the first side face are provided with N*M contacts, the contacts are arranged in N rows along a depth direction of the first groove, N is an integer greater than or equal to 2, each row comprises M contacts distributed along a circumferential direction of the first side face, and M is an integer greater than or equal to 2; and wherein the male connecting member comprises a first bottom face, the first bottom face is provided with a first boss, and the first boss comprises first side face and a first top face encompassed by the first side face; the first side face is provided with N*M contacts, the contacts are arranged in N rows along a height direction of the first boss, and each row comprises M contacts distributed along a circumferential direction of the first boss.

19. The mobile terminal according to claim 18, wherein the back shell comprises a flat plate portion facing away from a display screen of the mobile terminal, and the female connecting member or the male connecting member is disposed in the flat plate portion.

* * * * *